United States Patent Office 2,978,433
Patented Apr. 4, 1961

2,978,433

THERMOSETTABLE COMPOSITIONS OF METHYL METHACRYLATE, METHACRYLIC ACID, AND AMINOPLAST CONDENSATE, PROCESS OF MAKING SAME, AND ARTICLES OBTAINED

Melvin D. Hurwitz, Huntingdon Valley, Pa., assignor to Rohm & Haas Company, Philadelphia, Pa., a corporation of Delaware No Drawing. Filed July 26, 1956, Ser. No. 600,165

11 Claims. (Cl. 260—45.2)

This invention relates to polymerizable compositions and particularly to modified polymerizable methyl methacrylate compositions which are adapted to form shaped products of cross-linked character having improved resistance to heat and solvents. In essence, the present invention provides a modified methyl methacrylate composition which is of thermosetting character and is adapted to be polymerized and condensed to hard, homogeneous, tough, heat-resistant and solvent resistant articles.

In accordance with the present invention, a thermosetting composition is prepared from a mixture of methyl methacrylate and methacrylic acid containing 94 to 99 parts by weight of the former and 1 to 6 parts by weight of the latter, in conjunction with 1.2 to 10.5%, on the weight of the monomers specified, of an alkoxymethyl aminoplast resin-forming condensate in which the alkoxymethyl group has from 2 to 9 carbon atoms. This composition is provided with a small amount of a free radical initiator or catalyst which serves to copolymerize the methyl methacrylate with the methacrylic acid, the amount of such initiator being from 0.1 to 2%, based on the weight of these monomers. Small amounts such as 0.1 to 0.5%, on the weight of the monomers, of polymerization regulators may be employed, but are not essential.

The above composition is subjected to addition polymerization conditions such as are normally employed for the conversion of methyl methacrylate into molded or cast resin products. This polymerization is essentially a bulk polymerization since there is generally no solvent present other than the monomers themselves, which may serve as solvents during the initial stages of the polymerization. Ordinarily no plasticizer is needed, but if desired a suitably non-volatile plasticizer, such as tricresyl phosphate, t-butyl benzyl phthalate, or ethylene glycoladipic acid polyesters, may be incorporated in conventional amounts. Fillers and coloring matter, such as dyes and pigments, may also be incorporated in the usual fashion and in the usual amounts.

The polymerization may be effected entirely within a mold or a part of the polymerization may be effected before the composition is introduced into the mold, both types of procedures being described in U.S. Patents 2,067,580, 2,091,615, and 2,154,639. The composition of the present invention may be subjected to the polymerizing conditions mentioned in these patents. Generally, a temperature ranging from about 45° C. to about 130° C. or higher may be employed for a period of 4 to 20 hours depending on the thickness of the article being prepared. Preferably the molding is effected starting out at a temperature of 55° to 60° C. and ending at about 120° to 125° C., the temperature being allowed to rise gradually during the period. The casting or molding apparatus may be suitably provided with heating and cooling jackets or the like so as to maintain the temperature or control it in any desired manner. The cavity of the mold may be of any desired shape so as to provide flat sheets, cured sheets or products of any other desired three-dimensional shape.

There should be superimposed upon the normal molding cycle mentioned above a short period during which the temperature is elevated to about 130° C. to 225° C. for a period of half a minute to about half an hour, the longer time being associated with the lower temperature and vice versa in order to complete coreaction of the aminoplast with the acid groups in the copolymer.

The methacrylic acid, present as a monomer or as a component of a copolymer at various stages serves to catalyze the reaction of the aminoplast to an infusible and insoluble state. The methacrylic acid also takes part in the reaction in that it combines with the aminoplast and serves to cross-link the copolymer with the aminoplast by virtue of the methacrylic acid units in the copolymer, which react with the aminoplast. Because of the co-reaction of the several components during the polymerization and final condensation which later occurs during the curing stage, the products obtained are hard, homogeneous, resistant to heat and solvents, and comparatively infusible and insoluble. They are resistant to grease, they do not become tacky upon heating to elevated temperatures even as high as 150° C. or higher, they have improved resistance to abrasion as compared to poly(methyl methacrylate) and they retain the toughness and resistance to impact that is characteristic of poly(methyl methacrylate).

For effecting polymerization, the free radical initiator or catalyst may be any organic peroxide catalysts, peroxy catalysts, such as persulfates, and the azo catalysts. Examples of organic peroxide catalysts that may be used include benzoyl peroxide, acetyl peroxide, caproyl peroxide, t-butyl perbenzoate, t-butyl hydroperoxide. Examples of azo catalysts include azodiisobutyronitrile, azodiisobutyramide, dimethyl or diethyl or dibutyl azodiisobutyrate, azobis($\alpha,\gamma$-dimethylvaleronitrile), azobis($\alpha$-methylbutyronitrile), azobis($\alpha$-methylvaleronitrile), dimethyl or diethyl azobismethylvalerate, and the like.

Regulators that may be used include turpentine, unsaturated fatty acids such as oleic acid, linoleic acid or mixtures thereof, methallyl chloride, allyl alcohol, and so on.

In the preparation of the composition of the present invention, one may use any of the thermosetting alkylated aminoplast resin-forming condensates, such as the urea-aldehyde resins, the melamine-aldehyde resins, the dicyandiamide-aldehyde resins and other aminoplast-aldehyde resins such as those amino-triazine resins produced by the reaction of an aldehyde with formoguanamine, benzoguanamine, ammeline, 2-chloro-4,6-diamino-1,3,5-triazine, 2-phenyl-p-oxy-4,6-diamino-1,3,5-triazine, 6-methyl-2,4-diamino-1,3,5-triazine, 2,4,6-trihydrazine-1,3,5-triazine, and 2,4,6-triethyl-triamino-1,3,5-triazine, the mono-, di-, or trialkyl or mono-, di-, or triaryl melamines, for instance, 2,4,6-triphenyltriamino-1,3,5-triazine and the like. As aldehydes used to react with the amino compound to form the resinous material, one may use such aldehydes as formaldehyde, acetaldehyde, crotonic aldehyde, acrolein, or compounds which engender aldehydes, such as hexamethylenetetramine, paraldehyde, paraformaldehyde, trioxymethylene, and the like. Still further, one may use aromatic or heterocyclic aldehydes such as benzaldehyde, furfural and the like.

There may also be used N-alkoxymethyl acrylamide or N-alkoxymethyl methacrylamide in which the alkoxymethyl group may have from 2 to 5 carbon atoms. There may be used mixtures of these N-substituted acrylamides with the corresponding unsubstituted acrylamide or methacrylamide provided the alkoxymethyl-substituted acrylamide or methacrylamide is used in predominant proportions.

Among the alcohols which may be used in the preparation of the alkylated aminoplast resins are methyl alcohol, ethyl alcohol, butyl alcohol, 2-ethyl-butanol, 2-ethyl-hexanol, benzyl alcohol, and the like. In most cases, an alcohol containing from 1 to 6 carbons is used and preferably the alcohols contain from 1 to 4 carbon atoms. Although any of the alkylated aminoplast resins may be used, it is preferred that the butylated aminoplast resins be used, because of their improved compatibility with the polymers and copolymers of the present invention.

The following examples are illustrative of the present invention.

Example 1

A mixture of 90 parts by weight of methyl methacrylate, 5 parts by weight of methacrylic acid, 0.5 part of benzoyl peroxide, and 5 parts by weight of a butoxymethylmelamine (obtained by distillation of all solvent from Resin A of 2,681,897) is heated five minutes at about 60° C. and introduced into a mold (as in Example 1 of 2,154,639) wherein it is polymerized to form a ¼″ thick sheet with control of temperature to allow gradual rising to 125° C. in about twelve hours. Thereafter, the product is heated to 180° C. for five minutes. The product swells only 3.1% on soaking in chloroform for 90 minutes whereas poly(methyl methacrylate) dissolves. The product resists crazing for 20 minutes when tested with butyl lactate at 1000 lb. outer fiber stress whereas poly(methyl methacrylate) crazes in less than 10 minutes under these conditions.

Example 2

A mixture of 90 parts by weight of methyl methacrylate, 5 parts by weight of methacrylic acid, 0.5 part of benzoyl peroxide, and 5 parts by weight of a butoxymethylbenzoguanamine (obtained by distillation of all solvent from Resin C of 2,681,897) is heated five minutes at about 60° C. and introduced into a mold (as in Example 1 of 2,154,639) wherein it is polymerized to form a ¼″ thick sheet with control of temperature to allow gradual rising to 125° C. in about twelve hours. Thereafter, the product is heated to 180° C. for two minutes. The product swells only 5.1% on soaking in chloroform for 90 minutes whereas poly(methyl methacrylate) dissolves. The product resists crazing for 60 minutes when tested with butyl lactate at 1000 lb. outer fiber stress whereas poly(methyl methacrylate) crazes in less than 10 minutes under these conditions.

Example 3

Products similar to those of Example 2 are obtained when a mixture of 95 parts by weight of methyl methacrylate, 5 parts by weight of methacrylic acid, 0.5 part of benzoyl peroxide, and 5 parts by weight of a butoxymethylmelamine (obtained by distillation of all solvent from Resin A of 2,681,897) is heated five minutes at about 60° C. and introduced into a mold (as in Example 1 of 2,154,639) wherein it is polymerized to form a ¼″ thick sheet with control of temperature to allow gradual rising to 125° C. in about twelve hours. Thereafter, the product is heated to 180° C. for three minutes.

Example 4

A mixture of 92 parts by weight of methyl methacrylate, 1 part by weight of methacrylic acid, 3 parts by weight of methacrylamide, and 4 parts by weight of N-methoxymethyl methacrylamide is heated five minutes at about 60° C. and introduced into a mold (as in Example 1 of 2,154,639) wherein it is polymerized to form a ¼″ thick sheet with control of temperature to allow gradual rising to 125° C. in about twelve hours. Thereafter, the product is heated to 180° C. for two minutes. The product swells only 12.6% on soaking in chloroform for 90 minutes whereas poly(methyl methacrylate) dissolves. The product resists crazing for 150 minutes when tested with butyl lactate at 1000 lb. outer fiber stress whereas poly(methyl methacrylate) crazes in less than 10 minutes under these conditions.

Example 5

Products which swell even less in chloroform than those of Example 1 are produced when the procedure of Example 1 is followed with the same mixture as in Example 1 except that 10 parts of the butoxymethylmelamine is used.

Example 6

Products which swell even less in chloroform than those of Example 2 are produced when the procedure of Example 2 is followed with the same mixture as in Example 2 except that 90 parts of methyl methacrylate, 10 parts of methacrylic acid, and 8 parts of the butoxymethylmelamine are used.

Example 7

The procedure of Example 2 is followed with a mixture of 98 parts of methyl methacrylate, 2 parts of methacrylic acid, 0.6 part of benzoyl peroxide, and 1.2 parts of the butoxymethylbenzoguanamine. Hard, solvent-resistant sheets are obtained.

Example 8

A mixture of 90 parts by weight of methyl methacrylate, 5 parts by weight of methacrylic acid, 0.5 part of benzoyl peroxide, and 5 parts by weight of a butoxymethylurea (obtained by distillation of all solvent from Resin B of 2,681,897) is heated five minutes at about 60° C. and introduced into a mold (as in Example 1 of 2,154,639) wherein it is polymerized to form a ¼″ thick sheet with control of temperature to allow gradual rising to 125° C. in about twelve hours. Thereafter, the product is heated to 180° C. for five minutes. Hard, solvent-resistant sheets are thereby produced.

If desired, the sheet, before heating to 180° C. for five minutes, may be formed while being heated into any desired shape and then cured to infusible and insoluble condition while in this form by means of the second stage heating at 180° C. for five minutes.

Example 9

The procedure of Example 8 is repeated but with the amount of methyl methacrylate reduced to 75 parts, the methacrylic acid replaced with acrylic acid and with 20 parts of ethyl acrylate.

The methacrylic acid may be replaced with acrylic acid and in place of part of the methyl methacrylate, other esters of acrylic acid or methacrylic acid, especially those of methanol, ethanol, propanol, isopropanol, n-butanol and other alcohols having up to 6 carbon atoms may be used provided the copolymer contains at least about 75 parts by weight of methyl methacrylate. Thus, a preferred embodiment of this type consists of a mixture of monoethylenically unsaturated copolymerizable monomers consisting essentially of (1) methyl methacrylate, (2) methacrylic acid, and (3) an ester of an acid selected from the group consisting of acrylic acid and methacrylic acid with an alcohol having 1 to 6 carbon atoms, said monomers being present in weight proportions of at least 75 parts of (1), 1 to 6 parts of (2), and up to 24 parts of (3). However, in most cases, the binary copolymers of methyl methacrylate with methacrylic acid are preferred because they have the highest resistance to heat-distortion.

The term "consisting essentially of" as used in the definition of the ingredients present in the composition claimed is intended to exclude the presence of other materials in such amounts as to interfere substantially with the properties and characteristics possessed by the composition set forth but to permit the presence of other materials in such amounts as not substantially to affect said properties and characteristics adversely.

It is to be understood that changes and variations may

I claim:
1. A composition adapted to be thermoset to a hard, homogeneous resinous product consisting of a mixture of (a) monoethylenically unsaturated copolymerizable monomers consisting essentially of (1) methyl methacrylate and (2) methacrylic acid, said monomers being present in weight proportions of 94 to 99 parts of (1) and 1 to 6 parts of (2), and (b) a resin-forming alkylated condensate of formaldehyde with a member selected from the group consisting of urea, dicyandiamide, aminotriazines, acrylamide, and methacrylamide, said alkylated condensate containing alkoxymethyl groups having 2 to 5 carbon atoms, the amount of condensate being from 1.2 parts to 10.5 parts by weight per 100 parts by weight of copolymerizable monomers and the copolymerizable monomers being the only volatile material in the composition.

2. A composition as defined in claim 1 in which the condensate comprises a butoxymethylmelamine.

3. A composition as defined in claim 1 in which the condensate comprises a butoxymethylbenzoguanamine.

4. A composition as defined in claim 1 in which the condensate comprises a butoxymethylurea.

5. A composition as defined in claim 1 in which the condensate comprises an N-methoxymethyl-acrylamide.

6. A composition as defined in claim 1 in which the condensate comprises an N-methoxymethyl-methacrylamide.

7. A composition as defined in claim 1 in which the condensate comprises a mixture of methoxymethyl-methacrylamide with methacrylamide.

8. A composition adapted to be thermoset to a hard, homogeneous resinous product consisting of a mixture of (a) monoethylenically unsaturated copolymerizable monomers consisting essentially of (1) methyl methacrylate, (2) methacrylic acid, and (3) an ester of an acid selected from the group consisting of acrylic acid and methacrylic acid with an alcohol having 1 to 6 carbon atoms, said monomers being present in weight proportions of at least 75 parts of (1), 1 to 6 parts of (2), and up to 24 parts of (3), and (b) a resin-forming alkylated condensate of formaldehyde with a member selected from the group consisting of urea, dicyandiamide, aminotriazines, acrylamide, and methacrylamide, said alkylated condensate containing alkoxymethyl groups having 2 to 5 carbon atoms, the amount of condensate being from 1.2 parts to 10.5 parts by weight per 100 parts by weight of copolymerizable monomers and the copolymerizable monomers being the only volatile material in the composition.

9. A composition adapted to be thermoset to a hard resinous product consisting of a mixture of (a) monoethylenically unsaturated copolymerizable monomers consisting essentially of (1) methyl methacrylate and (2) methacrylic acid, said monomers being present in weight proportions of 94 to 99 parts of (1) and 1 to 6 parts of (2), and (b) a resin-forming alkylated condensate of formaldehyde with an aminotriazine, said alkylated condensate containing alkoxymethyl groups having 2 to 5 carbon atoms, the amount of condensate being from 1.2 parts to 10.5 parts by weight per 100 parts by weight of copolymerizable monomers and the copolymerizable monomers being the only volatile material in the composition.

10. A process of producing a shaped article which comprises heating a composition as defined in claim 1 with a small amount of free radical polymerization initiator for addition polymerization to a temperature of from 45° C. to 130° C., at least the last portion of this heating stage being effected while maintaining the composition in predetermined shape corresponding to that of the article to be formed, and subsequently heating the shaped article to a temperature of 130° to 225° C. for a time from about a half a minute to about a half an hour.

11. An article comprising the product obtained by the process of claim 10.

References Cited in the file of this patent

UNITED STATES PATENTS

| | | |
|---|---|---|
| 2,160,054 | Bauer et al. | May 30, 1939 |
| 2,173,005 | Strain | Sept. 12, 1939 |

FOREIGN PATENTS

| | | |
|---|---|---|
| 411,860 | Great Britain | June 13, 1934 |